United States Patent [19]

Watanabe et al.

[11] Patent Number: 5,204,031

[45] Date of Patent: Apr. 20, 1993

[54] POWDER OF OXIDE FOR DIELECTRIC CERAMICS AND A PROCESS FOR PRODUCING DIELECTRIC CERAMICS

[75] Inventors: Munetoshi Watanabe, Takatsuki; Yasuhiro Shimizu, Osaka; Hiroyuki Hata, Kobe, all of Japan

[73] Assignee: Osaka Titanium Co., Ltd., Hyogo, Japan

[21] Appl. No.: 827,537

[22] Filed: Jan. 30, 1992

Related U.S. Application Data

[63] Continuation of Ser. No. 589,118, Sep. 27, 1990, abandoned.

[30] Foreign Application Priority Data

Sep. 30, 1989 [JP] Japan ................................ 1-256556

[51] Int. Cl.$^5$ ............................................. C04B 35/46
[52] U.S. Cl. ................................. 264/63; 264/66; 252/62.9; 423/593; 423/598; 501/134; 501/135; 501/136
[58] Field of Search ............... 252/62.9; 423/593, 598; 501/134, 135, 136; 264/66, 63

[56] References Cited

U.S. PATENT DOCUMENTS

| | | | |
|---|---|---|---|
| 3,352,632 | 11/1967 | Sasaki | 252/62.9 |
| 3,725,298 | 4/1973 | Woodhead et al. | 252/62.9 |
| 3,963,630 | 6/1976 | Yonezawa et al. | 252/62.9 |
| 4,874,598 | 10/1989 | Oda et al. | 252/62.9 |

FOREIGN PATENT DOCUMENTS

| | | | |
|---|---|---|---|
| 0237640 | 9/1987 | European Pat. Off. | 501/134 |
| 44-008106 | 4/1969 | Japan | 252/62.9 |
| 48-038498 | 6/1973 | Japan | 252/62.9 |
| 61-106456 | 5/1986 | Japan | 501/134 |
| 62-187116 | 8/1987 | Japan | 501/134 |
| 63-085014 | 4/1988 | Japan | 501/134 |
| 63-206316 | 8/1988 | Japan | 501/134 |
| 924014 | 5/1982 | U.S.S.R. | 501/134 |

OTHER PUBLICATIONS

Thomson, Jr., "Chemical Preparation of PLZT Powders From Aqueous Nitrate Solutions," American Ceramic Society Bulletin, vol. 53, No. 5 pp. 421–424, 433, May 1974.

Kutty et al., "Direct Precipitation Of Lead Zirconate Titanate By The Hydrothermal Method", Mat. Res. Bulletin, vol. 19, pp. 1479–1488, Aug. 1984.

*Primary Examiner*—Mark L. Bell
*Assistant Examiner*—Anthony J. Green
*Attorney, Agent, or Firm*—Armstrong, Westerman, Hattori, McLeland & Naughton

[57] ABSTRACT

A powder of oxide which is a material for dielectric ceramics including perovskite-type double oxide containing lead, and a process for producing dielectric ceramics using the powder. In the process of this invention, perovskite-type double oxide containing lead are initially produced by means of hydrothermal reaction, and the powder is heat-treated at 500° to 1000° C. Consequently, the specific surface area of the powder becomes 20 m$^2$/g or less. The powder is mixed with binder and compressed, molded and debinded, and consequently, the compact attains 50% or more of theoretical density. Thereafter, the compact is sintered. As a result, the process of manufacture according to the present invention is capable of producing dielectric ceramics, wherein deformation and cracks do not occur.

6 Claims, 5 Drawing Sheets

POWDER OF OXIDE FOR DIELECTRIC CERAMICS AND A PROCESS FOR PRODUCING DIELECTRIC CERAMICS

This application is a continuation of application Ser. No. 589,118 filed Sep. 27, 1990, now abandoned.

BACKGROUND OF THE INVENTION

1. Field of the Invention

The present invention generally relates to a powder of oxide which is a material for a dielectric ceramics comprising perovskite-type double oxide containing lead; and to a process for producing dielectric ceramics using the powder. The dielectric ceramics are used for making electrical parts; such as, capacitor, filter, and microwave generator or the like.

2. Description of the Relevant Art

The dielectric ceramics which are produced by sintering synthesized powder of perovskite-type double oxide containing lead (e.g., lead zirconate titanate [$Pb(Zr,Ti)O_2$]) has practical applications in various fields as a material for dielectrics. There are many processes for producing powder made of dielectric ceramic materials including synthesized powder of perovskite-type double oxide containing lead. A production process for such a powder by means of hydrothermal reaction is disclosed in, for example, Japanese Patent Laid-Open Publication No.85014/88, wherein a homogenous and fine powder is obtained.

Recently, a process for producing powder in perovskite-type double oxide containing lead by means of hydrothermal reaction has been developed for providing powder of homogeneous component and dielectric property. Since the raw powder, produced by means of the hydrothermal reaction, of dielectric ceramics not only has homogenous component, but also fine particles, it is better than a raw powder that is produced by means of solid reaction with respect to low sintering temperature.

However, when the powder synthesized by means of hydrothermal reaction is mixed with a binder, compressed and molded, the density of the compacted powder before sintering is low. Therefore, shrinkage ratio during the sintering operation becomes high, and deformation and cracks tend to occur.

SUMMARY OF THE INVENTION

The low density in the compact powder, and the high shrinkage ratio of the compact at the sintering process are the main reasons for deformation and cracks.

It is presumed that the density of the compact is low, since it is made of fine systhesized powder and, at the extreme, by large specific surface areas.

The present inventors investigated the relationship between the specific surface area of the powder before sintering, and the shrinkage ratio of the compact at the sintering process. The results are as shown in FIG. 1. From the results shown in FIG. 1, it can be seen that the shrinkage ratio decreases with decreasing specific surface area of the powder. If the specific surface area is 20 $m^2/g$ or less, the shrinkage ratio is 20% or less, and the dense sintered compact is obtained with a few cracks.

In other words, the present invention is directed to the powder of perovskite-type double oxide containing lead which is synthesized by means of hydrothermal reaction, and has a specific surface area which is 20 $m^2/g$ or less. The present invention is similarly directed to a process for producing dielectric ceramics, which includes the steps of: (1)producing powder of perovskite-type double oxide containing lead by means of hydrothermal reaction; (2)growing particles of the powder by heating at 500° to 1000° C., and keeping the powder's specific surface area at 20 $m^2/g$ or less; (3)mixing with binder and molding; (4)debinding and keeping the theoretical density of the compact powder at 50% or more; and (5)sintering above the compact.

In accordance with one aspect of this invention, there are provided improvements in hydrothermal systhesized powder of perovskite-type double oxide containing lead, and a process for producing dielectric ceramics using improved hydrothermal synthesized powder.

It is a further object of this invention to provide a process for producing dense sintered compact without cracks.

These and other objects of the invention will be readily understood from the following description, taken in connection with the accompanying drawings.

DETAILED DESCRIPTION OF THE INVENTION

The perovskite-type double oxide is generally represented by the fomula ABO. A and B represent metal elements, and O represents oxygen. For example, A is at least one element among Pb, Sr, Ca, Ba, La, Li, or the like. B is at least one element among Zr, Ti, Nb, Mg, Ni, Fe, W, Mn or the like. It is preferable that the process for producing powder of perovskite-type double oxide containing lead using hydrothermal reaction is a method which includes the following steps: (a) reacting water-soluble lead oxide and low concentration aqueous solution of alkaline metal in a reaction vessel and precipitating lead group hydroxide; (b) adding water-soluble salt which is produced hydroxide, (i.e. lead group hydroxide,) and precipitating the hydroxide; (c) reacting hydrothermally under high temperature and high pressure in the reaction vessel; and (d) filterating, cleaning and drying.

Hydrothermal reaction preferably performed under 12 pH or more at a temperature between 150° and 200° C. The produced powder is heat-treated at a temperature between 500° and 1000° C. before compressing and molding. Particle of produced powder is grown until the specific surface area of the particle is 20 m²/g or less. Heat treatment is performed under atmospheric pressure at between one and five hours.

The powder obtained by heat treatment, according to the above-described steps, is mixed with binder, and is compressed and moleded. Molding pressure is about 1 or 3 ton/cm².

The compact is debinded with heat treatment at between 400° C. and 600° C. and for 1 or 2 hours, and has a density of 50% or more of theoretical density.

With respect to the step of growing powder particles, the compact can have a density value between 50 and 70% of theoretical density after debinding.

The compact is sintered as a ceramic component. The preferable sintering temperature is between 800° and 1300 ° C. for 1 to 5 hours. This sintering step is performed under atmosphere of lead or atmospheric pressure.

The specific surface area of systhesized powder is usually as large as 20 to 70 m²/g, and the converted particle diameter, assuming a globular particle, is 0.05 μm or less.

Figure 1:
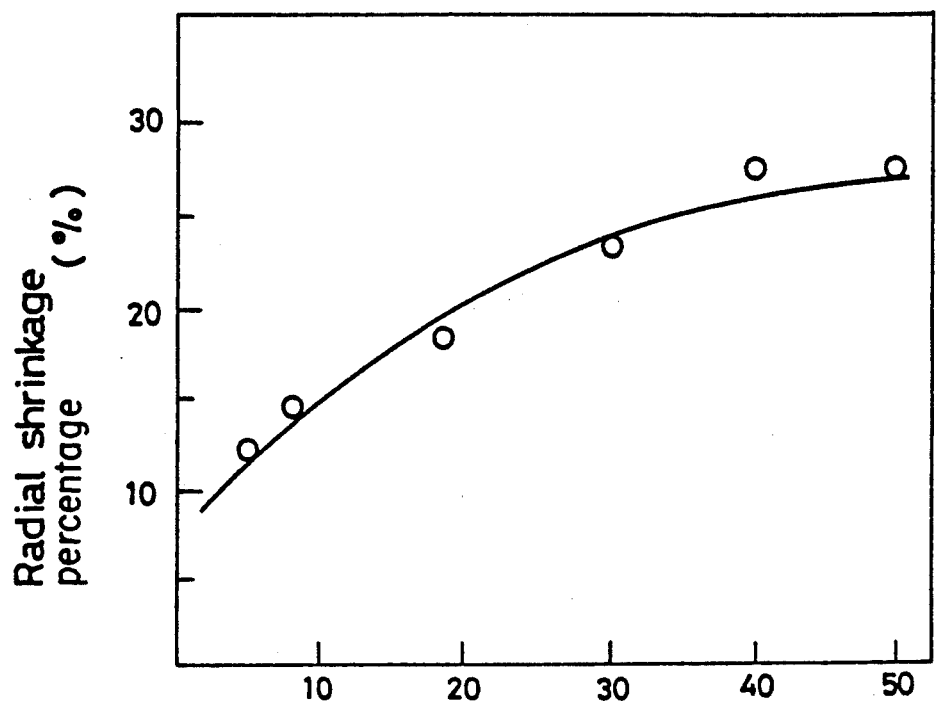
FIG. 1 is a diagram showing the relationship between the specific surface area of hydrothermal synthesized powder, and the shrinkage ratio after molding and sintering the hydrothermal synthesized powder according to the present invention.

After, for example, 8 wt % PVA solution, as a binder, is added and mixed at 5 to 10% by weight to the powder, the density of the compact that is compressed and molded under 1 or 2 ton/cm² pressure and debinded for 2 hours at 600° C. dose not reach 50% of theoretical density. Although shrinkage ratio of 20% or more is essential for obtaining sintered compact having the density which is near theoretical density, the shrinkage gives the compact deformation(warp) and cracks. This is caused by the particle diameter of powder being too small, and the void ratio of the compact becoming large. When the specific surface area of the powder is treated at 20 m²/g or less, the compact is debinded, as in the manner discussed above, and when the compact is burnt, shrinkage ratio becomes 20% or less, as shown in FIG. 1. Accordingly, little deformation and crack are recognized.

Before molding, when synthesized powder is heated at a temperature between 500° to 1000° C., the powder is grown. Consequently, powder with a specific surface area of 20 m²/g, and particle size converted to globular particle of 0.05 μm or more is obtained. Thereafter, the density of the molded compact reaches 50 to 70% of theoretical density. When this compact is sintered, the sintered compact is obtained without deformation and cracks.

According to the present invention, powder synthesized by means of hydrothermal reaction (i.e., with fine particle, and with high homogeneous component) is used, and dielectric ceramics can be provided without deformation and cracks.

The process, according to the present invention, is excellent as a process for producing dielectric ceramics comprising powder of perovskite-type double oxide containing lead.

The present invention will now be described in more detail with reference to the following examples and comparative example which should not be construed as limiting the scope of the present invention.

DESCRIPTION OF PREFERRED EMBODIMENTS

EXAMPLE 1

Powder systhesized by means of hydrothermal reaction is produced with the following steps;

(i) 1375 g of potassium hydroxide(KOH) is dissolved in water with a total amount of 3500 ml. Aqueous solution, 650g of lead ( II ) nitrate ($Pb(NO_3)_2$), is dissolved in 1500 ml of water, and added. The mixtures are allowed to react for 30 minutes at room temperature in order to obtain lead group precipitate;

(ii) the mixed solution, which includes aqueous solution of 393.4 g of oxyzirconium-chloride ($ZrOCl_2$ $8H_2O$) is dissolved in 500 ml of water and 179 g of aqueous solution of $TiCl_4$. (Ti: 16.7 wt %) and 69.0 g of lanthanum nitrate ($La(NO_3)_3$ $6H_2O$)is dissolved in 150 ml of water and added. The mixtures are then allowed to react for 30 minutes at room temperatue to obtain a zirconium group, and a titanium group, and a lanthanum group precipitation;

(iii) then, the suspension with all its precipitates is moved to the autoclave, and allowed to react for 5 hours at 180° C. in the autoclave. The produced precipitation is washed with water and dried for 15 hours at 120° C.

Figure 2:
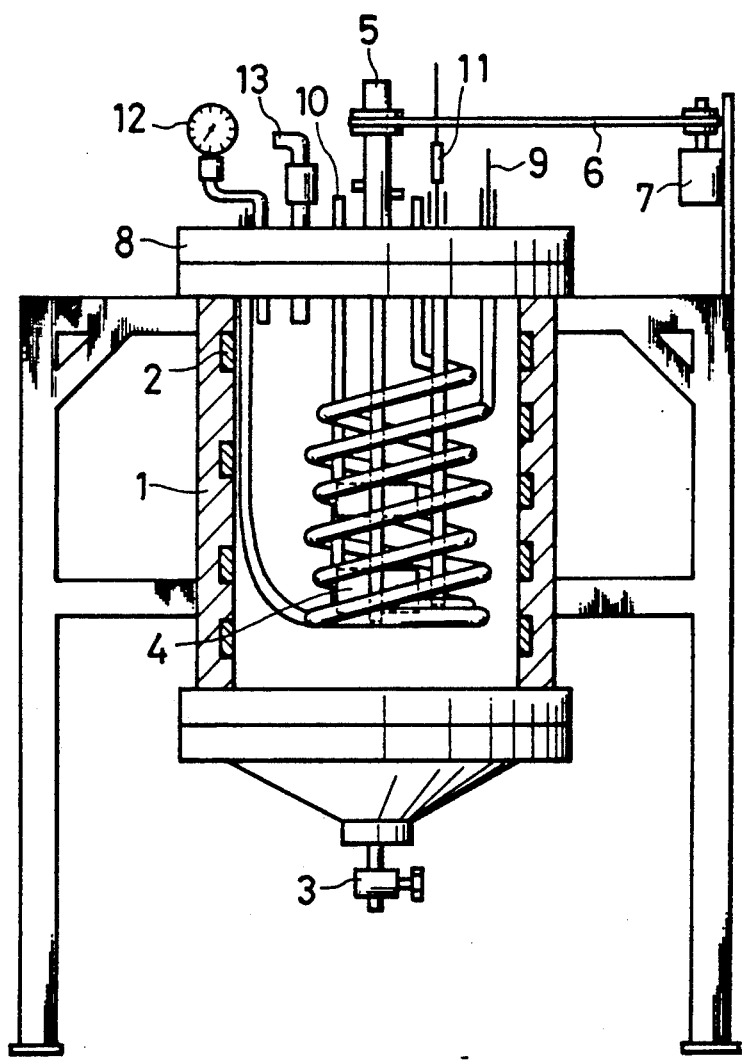
FIG. 2 is a diagrammatic sectional view of an autoclave.

The autoclave, as illustrated in Fig.2, is housed within a cylindrical container 1 that is molded with heat insulating material to a flexible heater 2 for keeping the heat, and is connected below the container 1 to a ball valve 3. A stirrer 5 having stirring wings 4 is provided at the center of the cylindrical container 1. The stirrer 5 is connected with a stirring motor 7 through V-belt 6.

A heater 9, a condenser tube 10, a thermocouple for measuring temperature 11, a pressure gauge 12 and a safety valve 13 are fixed to a flange 8 above the cylindrical container.

In the above-described autoclave, the reaction is subjected to constant temperature and pressure. The powder obtained in the manner described above is generally represented by the formula $Pb_{(1-x)}La_x(Zr_{1-y}Ti_y)_{1-x/4}O_3$, whereby, in the present example, x is 0.09 and y is 0.35. The powder has been investigated with respect to characteristics and degree of sintering.

Figure 3:
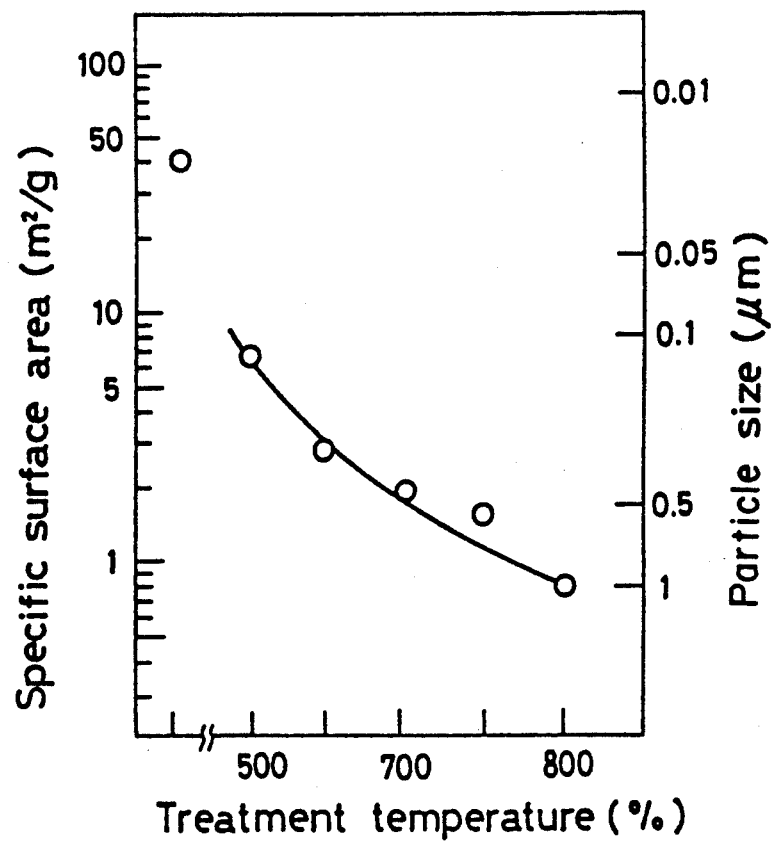
FIG. 3 is a diagram indicating the specific surface area, and particle size converted to globular particle of powder which is treated with heat for about 1 hour at 500° to 900° C.

FIG. 3 shows the specific surface area measured by BET method, and particle size converted to globular particle of powder that is heated for 1 hour at 500° to 900° C. The specific surface area of the unheated powder is as large as 40 m²/g, and its particle diameter is as small as 0.02 μm. On the other hand, the powder that is heated for 1 hour at 900° C. has particle diameter which is the order of 1 μm.

The degree of sintering for the powder that is heated for 1 hour at 700° C. has also been investigated. More particularly, 8 wt % PVA solution as a binder is added to 5 % by weight to each powder, and they are mixed in a mortar. Then, they are compressed and molded to obtain a compact with a diameter of 16 mm and with a thickness of 5 mm under 1 ton/cm². After this compact is debinded with heat for 2 hours at 600° C., its density is investigated. The results are shown in Table 1.

TABLE 1

|   | compact density (g/cm³) | $\frac{\text{compact density}}{\text{theoretical density}} \times 100$ |
|---|---|---|
| ① unheated powder | 3.0 | 38% |
| ② heated powder 700° C., 1 hour | 4.7 | 60% |

*theoretical density is 7.8 g/cm³.

Table 1 shows that compound density of heated powder is 4.7 g/cm³ and non-heated powder is 3.0 g/cm³. With respect to the ratio for theoretical density (7.8 g/cm³), the former is 60% while the latter is 38%. It is assumed that nonheated powder is super fine powder as can be recognized from the specific surface area, and it is likely to be influenced by adhesion and cohesion among the particles. Therefore, the void ratio is high, and double density is not high. In contrast, heated powder does not have the problem as described above since the powder particle is grown to a large extent to a first order particle. Therefore, compact density becomes large.

The compacts are then sintered for 2 hours at 1000° to 1250° C., and the sintering density and the radial shrinkage ratio are investigated. The results are shown in FIG. 4 and FIG. 5.

Figure 4:
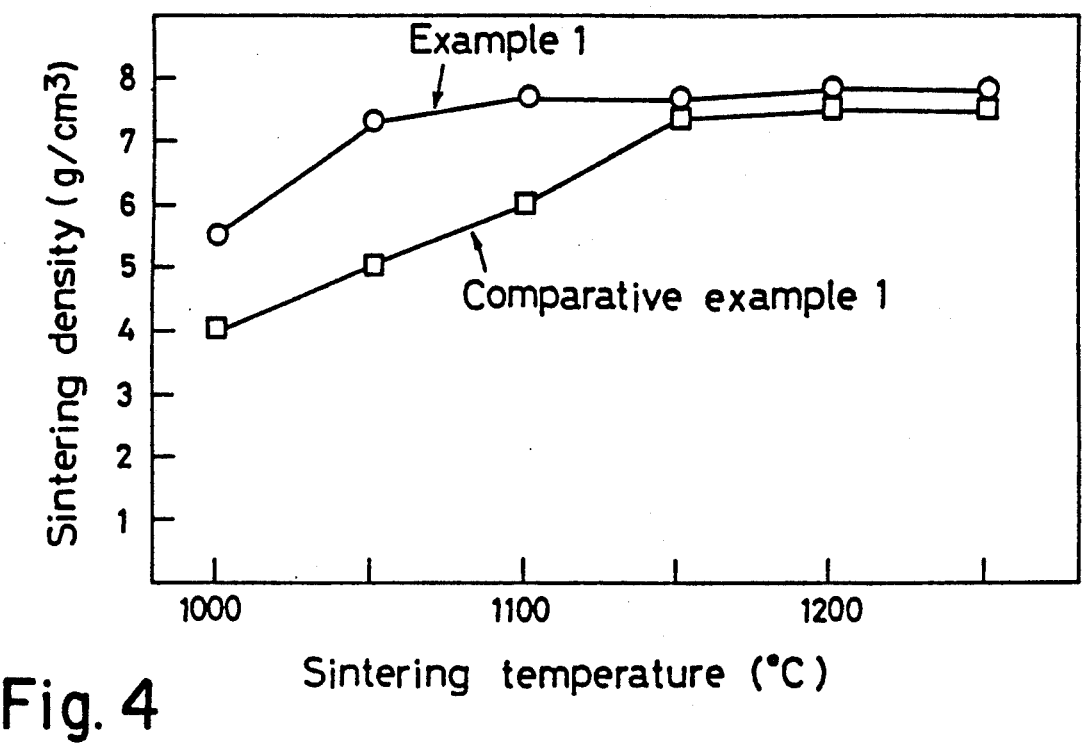
FIG. 4 is a diagram indicating the relationship between the sintering temperature and density of sintered compact which is prepared in substantially the same manner as in Example 1 and Comparative Example 1.
Figure 5:
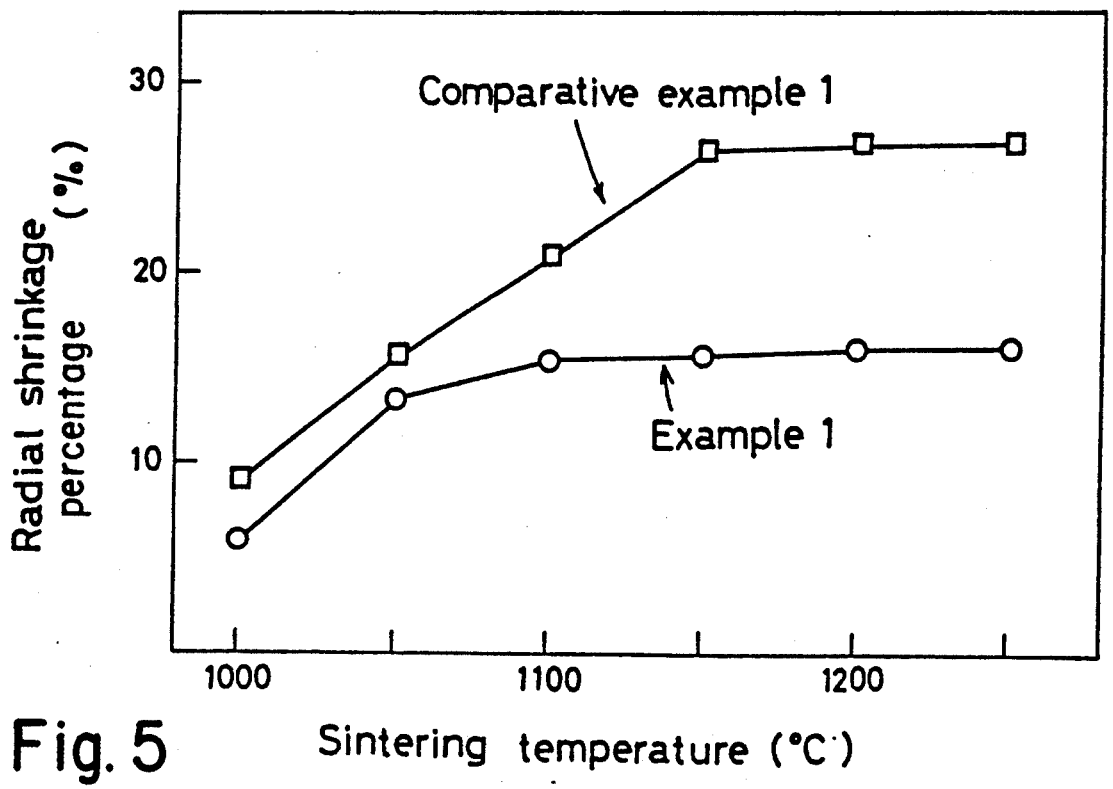
FIG. 5 is a diagram indicating the relationship between the sintering temperature and radial shrinkage ratio of sintered compact which is prepared in substantially the same manner as in Example 1 and Comparative Example 1.

FIG. 4 shows the relationship between the sintering temperature and the radial shrinkage ratio. FIG. 4 shows the relationship between the sintering temperature and the radial shrinkage ratio. In these illustrations, the example sintering is for the compact shown as ② in FIG. 1, while the comparative sintering is for the compact shown as ① in Table 1.

In the example, sintering density is reached about theoretical density at a sintering temperature of 1100° C. or more, shrinkage ratio is about 15%, and a dense sintered compact is obtained without crack. On the other hand, in the comparative example, sintering density does not reach to about theoretical density until at a sintering temperature of 1250° C., and the shrinkage ratio is as large as 20% or more at a sintering temperature of 1100° C. or more, and cracks are recognized for the most part in the component. 1250° C., and the shrinkage ratio is as large as 20% or more at a sintering temperature of 1100° C. or more, and cracks are recognized for the most part of the component.

EXAMPLE 2

Powder synthesized by means of hydrothermal reaction is produced as follows:

(i) 1375 g of potassium hydrochloride (KOH) is dissolved in water at a total amount of 3500 ml. Aqueous solution 821.9 g of lead (II) nitrate (Pb(NO₃)₂) is dissolved in 1500 ml of water, and is added. The mixtures are allowed to react for 30 minutes at room temperature to obtain lead group precipitate.

(ii) the mixed solution which comprises aqueous solution with 348.5 g of oxyzirconium chloride (ZrOCl₂ 8H₂O) being dissolved with 700 ml of water and 273.3 g of aqueous solution of TiCl₄ (Ti:16.8 wt %) being added. The mixtures are allowed to react for 30 minutes at room temperature to obtain a zilconum group and titanum group precipitation;

(iii) then, the suspension with all the precipitate is moved to the autoclave and allowed to react for 5 hours at 180° C. The produce precipitate is washed with water and dried for 15 hours at 120° C.

The powder obtained in the manner described above is generally represented by the formula Pb(Zr$_{0.53}$Ti$_{0.47}$)O₃, and has been investigated with respect to property and degree of sintering.

When specific surface area is investigated for the powder A, obtained in the manner above, non-heated, and for powder A is as large as 45 m²/g, while, on the other hand, heated powder B is as small as 15 m²/g.

Then, 8 wt % PVA solution as a binder is added to 10 % by weight to each powder, and they are mixed in a mortar. The mixtures are then compressed and molded to obtain a compact with a diameter of 16 mm, and a thickness of 5 mm under 1 ton/cm². After this compact is debinded with heat for 2 hours at 600° C., its density is investigated. The results are shown in Table 2.

TABLE 2

|   | compact density (g/cm³) | $\frac{\text{compact density}}{\text{theoretical density}} \times 100$ |
|---|---|---|
| ① unheated powder | 3.1 | 40% |
| ② heated powder 700° C., 1 hour | 4.8 | 62% |

*theoretical density is 7.8 g/cm³.

Table 2 shows that the compound density of heated powder is 4.8 g/cm³, and the compound density of non-heated powder is 3.1 g/cm³. With respect to the ratio of the theoretical density, the former is about 62% while the latter is about 40%.

Figure 6:
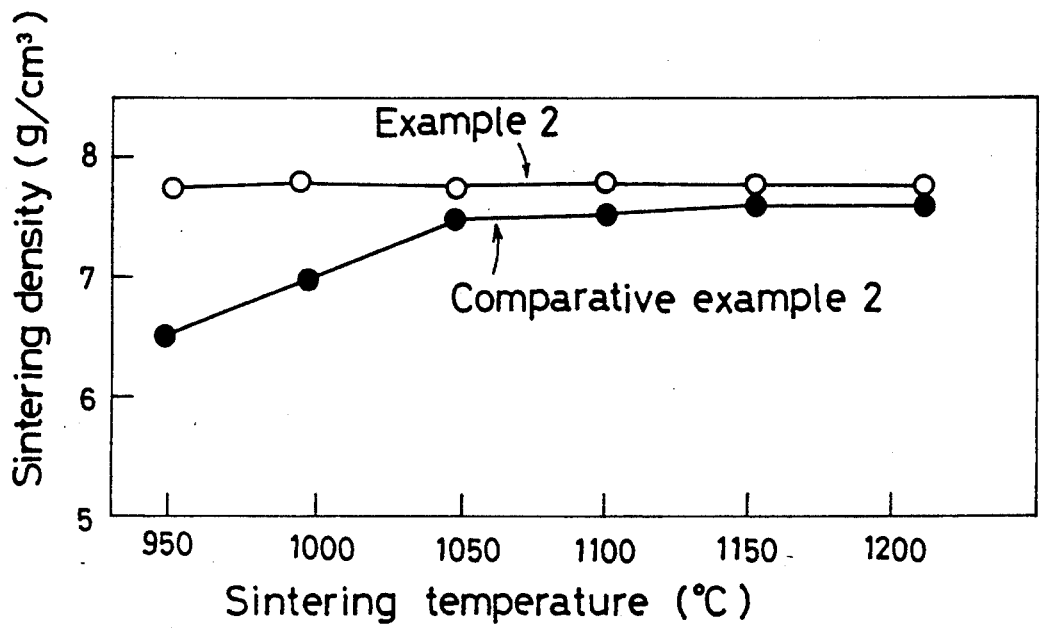
FIG. 6 is a diagram indicating the relationship between sintering temperature and sintering density of sintered compact which is prepared in substantially the same manner as in Example 2 and Comparative Example 2.
Figure 7:
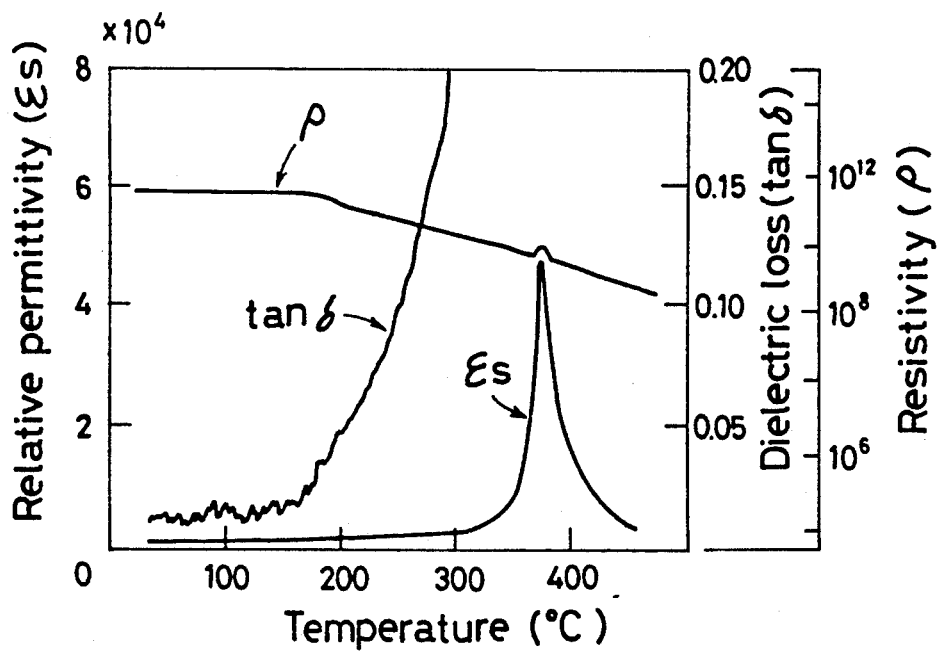
FIG. 7 is a diagram indicating the relationship between temperature and relative permittivity, dielectric loss and resistivity of sintered compact obtained in Example 2.
Figure 8:
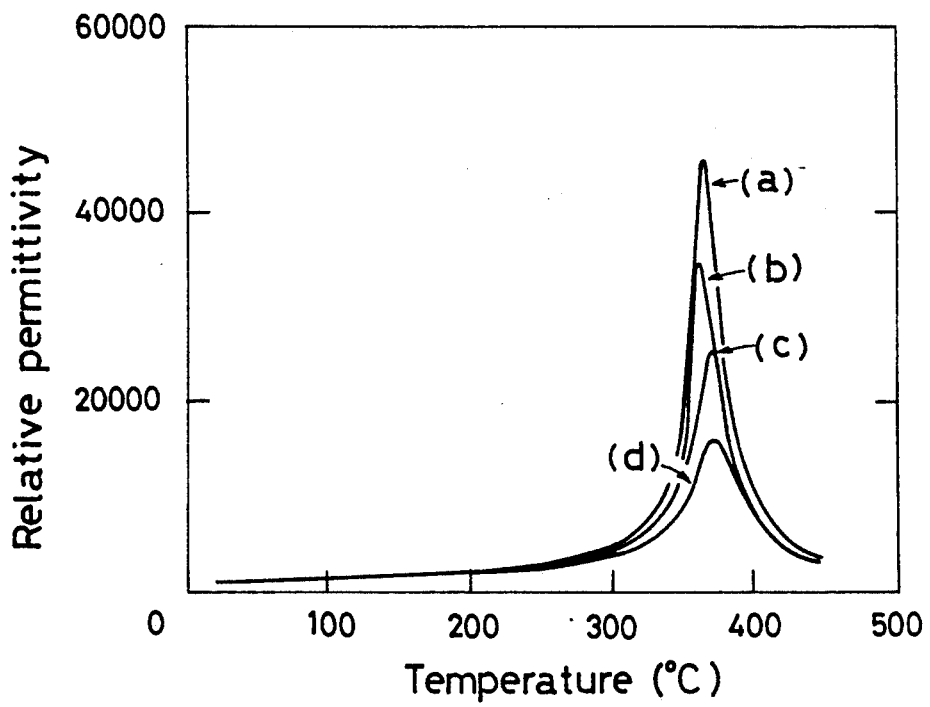
FIG. 8 is a diagram indicating the relationship between temperature and relative permittivity of sintered compact obtained in Example 2.
Figure 9:
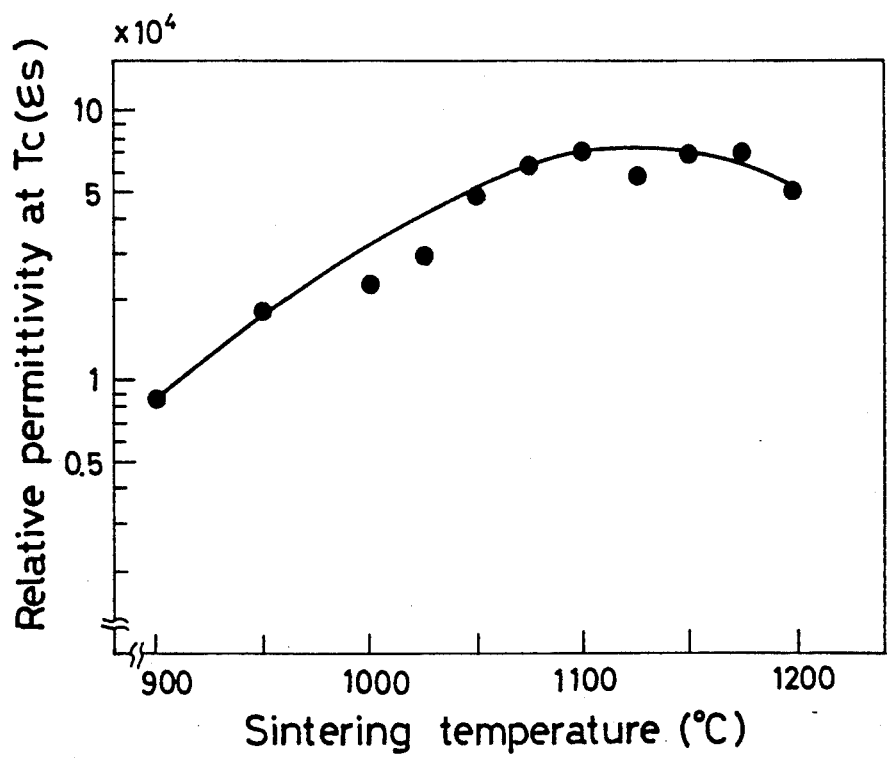
FIG. 9 is a diagram indicating the relationship between sintering temperature and relative permittivity.

Then, the compacts are sintered for 2 hours at 950° or 1250° C., and the sintering density is investigated. FIG. 6 shows the relationship between the sintering temperature and the sintering density.

In these illustrations, the example sintering is for the compact shown as ② in Table 1, and the comparative sintering is for the compact shown as ① in Table 1.

In the example sintering, density is reached about theoretical density at a sintering temperature of 1050° C. or more, and a dense sintered compact without cracks is obtained.

On the other hand, in the comparative example, sintering density does not reach to about theoretical density until at a sintering temperature of 1200° C. or more, and for the most part, cracks occur. It is noted that not only density, but also other properties (e.g., relative permittivity, dielectric loss, resistivity or the like) are very good for the example sintered compact.

While the invention has been particularly shown and described in reference to preferred embodiments thereof, it will be understood by those skilled in the art that changes in form and details may be made therein without departing from the spirit and scope of the invention.

What is claimed is:

1. A process for producing dielectric ceramics, comprising the steps of:
    producing a lead containing perovskite compound, represented by the formula ABO₃, A and B representing metal elements, and O representing oxygen, powder compound of fine particles containing lead by hydrothermal reaction;
    heating said powder, at a temperature of between 500° C. and 1000° C., said powder attaining a specific surface area of at most 20 m²/g;
    mixing binder with said powder;

compressing, molding and debinding said powder mixed with said binder so as to obtain a compact having at least 50% of theoretical density; and
sintering said compact at a temperature of less than 1300° C. compact, said compact attaining a shrinkage ratio of at most 20% to thereby obtain a homogeneous composition and few or no crack.

2. A process according to claim 1, wherein the sintering temperature is between 800° C. and 1300° C., and the sintering time is between 1 hour and 5 hours.

3. A process according to claim 1, wherein said perovskite compound is (Pb, La) (Zr, Ti)O$_3$.

4. A process according to claim 3, wherein the sintering temperature is between 1100° C. and 1300° C., and the sintering time is about 2 hours.

5. A process according to claim 1, wherein said perovskite compound is Pb(Zr, Ti)O$_3$.

6. A process according to claim 5, wherein the sintering temperature is between 1050° C. and 1300° C., and the sintering time is about 2 hours.

* * * * *